US007827606B2

(12) United States Patent
Rits et al.

(10) Patent No.: US 7,827,606 B2
(45) Date of Patent: Nov. 2, 2010

(54) REVERSE ENGINEERING ACCESS CONTROL

(75) Inventors: Maarten E. Rits, Nice (FR); Benjamin De Boe, Kontich (BE)

(73) Assignee: SAP AG, Walldorf (DE)

( * ) Notice: Subject to any disclaimer, the term of this patent is extended or adjusted under 35 U.S.C. 154(b) by 1381 days.

(21) Appl. No.: 11/284,458

(22) Filed: Nov. 21, 2005

(65) Prior Publication Data

US 2006/0143704 A1 Jun. 29, 2006

(30) Foreign Application Priority Data

Dec. 23, 2004 (EP) .................................. 04293112

(51) Int. Cl.
*G06F 12/14* (2006.01)

(52) U.S. Cl. .......................................... 726/17; 726/27

(58) Field of Classification Search .................. 726/17, 726/27

See application file for complete search history.

(56) References Cited

U.S. PATENT DOCUMENTS 5,335,346 A 8/1994 Fabbio
7,409,447 B1 * 8/2008 Assadzadeh ................ 709/225
2002/0062449 A1 * 5/2002 Perna et al. ................ 713/200
2004/0128556 A1 7/2004 Burnett
2005/0283676 A1 * 12/2005 Begg et al. .................... 714/38

FOREIGN PATENT DOCUMENTS

WO WO-0241150 A1 5/2002
WO WO-03019854 A1 3/2003

OTHER PUBLICATIONS

Powell, D. , "European Search Report", (Jun. 6, 2005),10 pages.

* cited by examiner

*Primary Examiner*—Kambiz Zand
*Assistant Examiner*—Aubrey H Wyszynski
(74) *Attorney, Agent, or Firm*—Schwegman, Lundberg & Woessner, P.A.

(57) ABSTRACT

Systems and methods for reverse engineering access control include determining a set of potential access control target methods, functions and/or subroutines that may be used in software applications. A software application is then analyzed to determine if the access control targets are present in the software application. If an access control target is used by the software application, then the access control policy for the target is analyzed to determine the roles, privileges, or rights that are necessary to successfully execute the access control target. A report is then generated that provides information about the access control policy elements actually used by the software application.

27 Claims, 9 Drawing Sheets

```
<policy>
   <target>
         <subject>
              <subjectmatch attribute="role" value="minister" match="string-equal"/>
         </subject>
         <action>
               <actionmatch attribute="method-name" value="displayDraft"
                                 match="string-equal"/>
         </action>
         <anyResource/>
   </target>
   <rule effect="permit"/>
</policy>
```

FIG. 3A

```
<method-permission>
        <role-name>minister</role-name>
        <method>
            <ejb-name>BusinessEJB</ejb-name>
            <method-intf>Remote</method-intf>
            <method-name>displayDraft</method-name>
        </method>
        <method>
            <ejb-name>BusinessEJB</ejb-name>
            <method-intf>Remote</method-intf>
            <method-name>reviewDraft</method-name>
        </method>
</method-permission
```

FIG. 3B

```
grant Principal reac.jaas.ac.REACPrincipal "minister" {
      permission reac.jaas.ac.REACPermission "exit";
      permission reac.jaas.ac.REACPermission "displayDraft";
      permission reac.jaas.ac.REACPermission "reviewDraft";
      permission reac.jaas.ac.REACPermission "startDraft";
      permission reac.jaas.ac.REACPermission "displayReview";
}
```

FIG. 3C

```
<accesscontrolledtarget>
   <accesscontroltype type="J2EEDD"/><accesscontrolfile path="BusinessEJB.xml"/>
   <target>
    <multipletarget boolean="AND">
         <singletarget type="class" strvalue="reac.j2ee.beans.business.Business"/>
         <singletarget type="methodname" strvalue="doAction"/>
    </multipletarget>
   </target>
</accesscontrolledtarget>
<accesscontrolledtarget>
   <accesscontroltype type="XACML"/><accesscontrolfile path="WSPolicy.xacml"/>
   <target>
    <multipletarget boolean="AND">
         <singletarget type="class" strvalue="reac.ws.ac.AccessController"/>
         <singletarget type="methodname" strvalue="checkAccess"/>
    </multipletarget>
   </target>
</accesscontrolledtarget>
<accesscontrolledtarget>
   <accesscontroltype type="JAAS"/><accesscontrolfile path="jaas.policy"/>
   <target>
    <multipletarget boolean="AND">
         <singletarget type="class" strvalue="reac.jaas.ac.AccessController"/>
         <singletarget type="methodname" strvalue="checkActionPermission"/>
    </multipletarget>
   </target>
</accesscontrolledtarget
```

FIG. 6

```xml
<sniffingreport date_generated="7 Sep 2004 12:20:10 GMT">
    <downcall>
        <targetobject><class fqname="reac.j2ee.beans.business.Business"/></targetobject>
        <targetmethod fqname="reac.j2ee.beans.business.Business.doAction" scope="public">
            <returntype><class fqname="java.lang.String"/></returntype>
            <argument rank="0"><class fqname="int"/></argument>
        </targetmethod>
        <stacktraceelement rank="0" filename="BusinessClient.java"
            linenumber="69" methodname="doAction" isnativemethod="FALSE">
            <class fqname="reac.j2ee.client.BusinessClient"/>
        </stacktraceelement>
        ...
        <policy>
            <allowedroles>
                <role name="judicial authority"/>
                <role name="minister"/>
                <role name="president"/>
                <role name="admin"/>
            </allowedroles>
        </policy>
    </downcall>
    ...
    <allowedroles>
        <role name="president"/>
        <role name="admin"/>
    </allowedroles>
</sniffingreport
```

FIG. 7

REVERSE ENGINEERING ACCESS CONTROL

CLAIM OF PRIORITY

The present patent application claims the priority benefit of the filing date of European Application (EPO) No. 04 293 112.1 filed Dec. 23, 2004, the entire content of which is incorporated herein by reference.

TECHNICAL FIELD

The present application relates to access control in computer systems communication, and in particular, systems and methods for reverse engineering access control in computer systems.

BACKGROUND

Many software applications include some type of access control technology, either for the application itself or for one or more of the components used by the application such as database components or web services components. Access control technologies vary, and include role based security, user identification and authorization, rights based access, or access privileges. In certain cases, use of access control and the assignment of appropriate roles may be legally mandated. For example, the Health Insurance Portability and Accountability Act of 1996 includes security and data privacy provisions that make access control a vital part of software in the health care industry.

Access control may be complicated by the fact that software applications may be combined in workflows. Workflows are typically a series of two or more applications that perform a series of tasks. Each of the software applications in the workflow may use differing types and combinations of access control technology, each of which may require different roles, rights or privileges.

It is desirable that a user of a software application have a role with sufficient rights or privileges to use the application, but not more rights or privileges that appropriate for the role. Determining the appropriate role, rights or privileges can be difficult in an environment where multiple access control technologies may be present in a workflow or application. A user whose role or privileges are insufficient will be unable to successfully execute the application or workflow. A user whose role or privileges are set too high may be granted access to applications or data they shouldn't have.

Because it can be difficult to determine a correct role or privilege level, system administrators are often tempted to err on the side of making sure the user can run the application or workflow by setting the role or privilege level higher than the user's actual role warrants. This is undesirable because the user may then either inadvertently or maliciously gain access to software and data that the user is not meant to access.

SUMMARY

One aspect of the various system and method embodiments includes determining a set of potential access control target methods, functions and/or subroutines that may be used in software applications. A software application is then analyzed to determine if the access control targets are present in the software application. If an access control target is used by the software application, then the access control policy for the target is analyzed to determine the roles, privileges, or rights that are necessary to successfully execute the access control target. A report is then generated that provides information about the access control policy.

A further aspect of the system and method embodiments includes inserting a call to an access control policy analysis component when an access control target is found. The access control policy analysis component may be a policy engine.

A still further aspect of the system and method embodiments includes using a code weaving component to insert the call to the access control analysis component.

The present application describes systems, clients, servers, methods, and computer-readable media of varying scope. In addition to the aspects and advantages of the present invention described in this summary, further aspects and advantages of the invention will become apparent by reference to the drawings and by reading the detailed description that follows.

BRIEF DESCRIPTION OF DRAWINGS

FIGS. 3A-3C illustrate example configuration files use in access control technologies used in various embodiments of the invention.

FIG. 6 illustrates an example configuration file according to an embodiment of the invention.

FIG. 7 illustrates an example report according to an embodiment of the invention.

DETAILED DESCRIPTION

In the following detailed description of example embodiments of the invention, reference is made to the accompanying drawings that form a part hereof, and in which is shown by way of illustration specific example embodiments in which the inventive subject matter may be practiced. These embodiments are described in sufficient detail to enable those skilled in the art to practice the various embodiments of the invention, and it is to be understood that other embodiments may be utilized and that logical, mechanical, electrical and other changes may be made without departing from the scope of the inventive subject matter. The following detailed description is, therefore, not to be taken in a limiting sense.

In the Figures, the same reference number is used throughout to refer to an identical component which appears in multiple Figures. Signals and connections may be referred to by the same reference number or label, and the actual meaning will be clear from its use in the context of the description.

Figure 1:
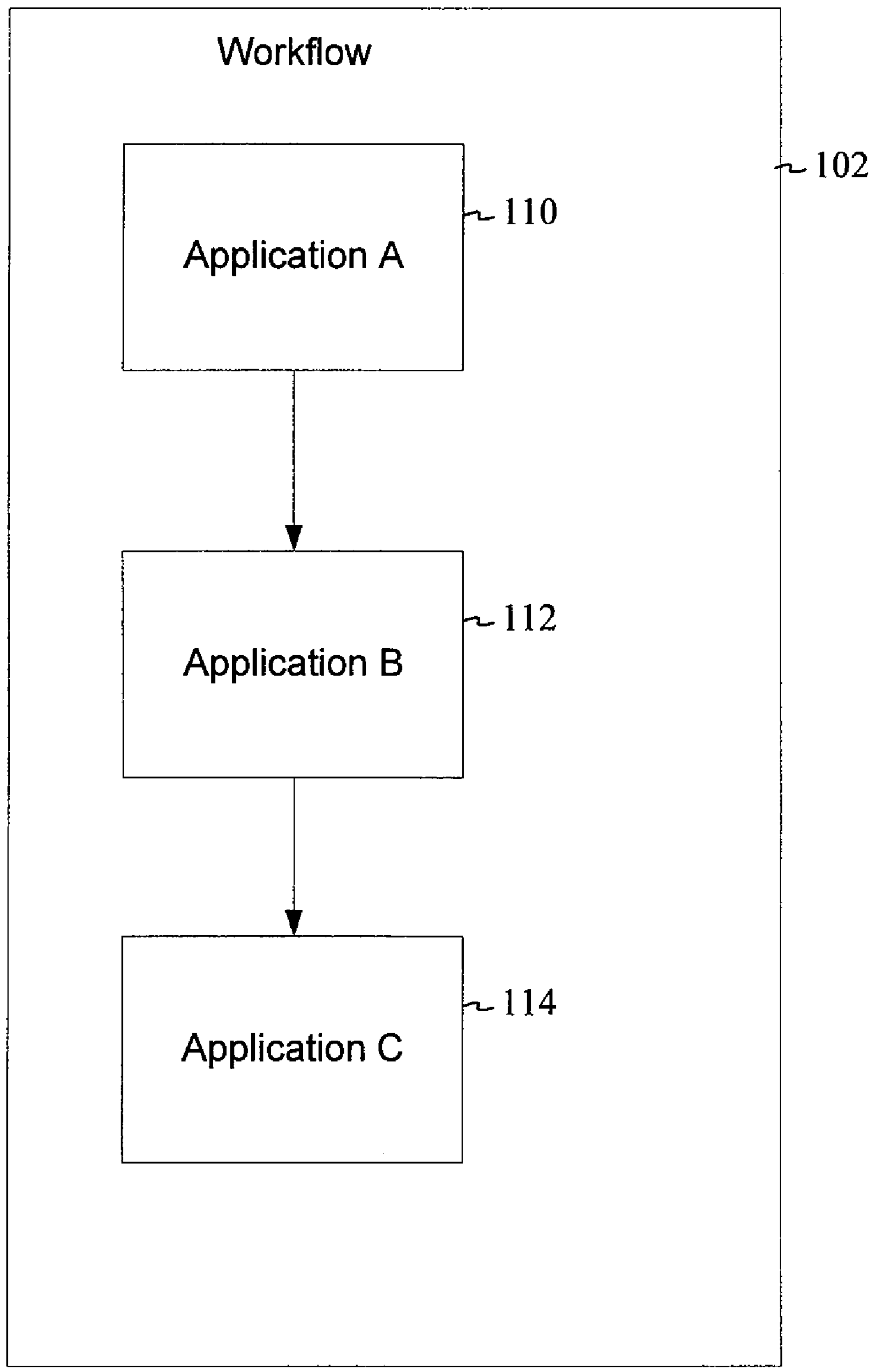
FIG. 1 illustrates a workflow in which embodiments of the invention may be practiced.

FIG. 1 illustrates an example workflow software environment in which embodiments of the invention may be practiced. In the example environment, workflow 102 includes three software applications 110, 112 and 114. The workflow invokes each of the applications as needed or as indicated by a user. Although three software applications are shown in FIG. 1, those of skill in the art will appreciate that a workflow may be comprised of any number of software applications. In some embodiments, a software application may be developed using the JAVA™ programming language and a suitably configured development environment. However, the embodiments of the inventions are not limited to a particular programming language or development environment. In alternative embodiments, the software applications may be developed using ABAP (Advanced Business Application Programming Language) programming language and development environment available from SAP or the .NET framework development environment available from Microsoft Corporation.

Figure 2:
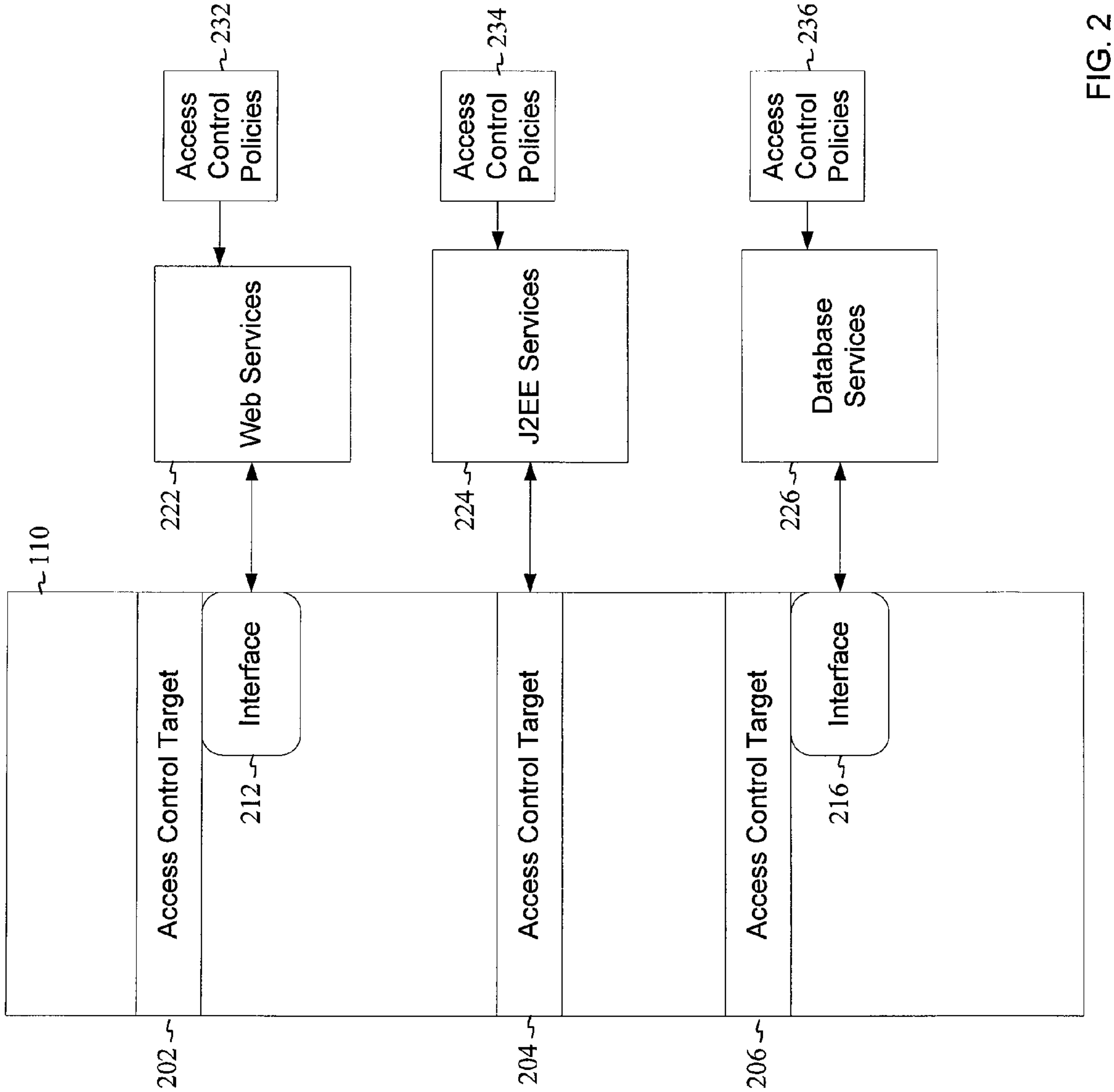
FIG. 2 illustrates a software application environment in which embodiments of the invention may be practiced.

FIG. 2 illustrates the major components of a software application 110 in which embodiments of the invention may be practiced. At one or more points during its control flow, software application 110 may execute code to invoke an access control target 202, 204 or 206. For the purposes of this specification, an access control target is a call to a function, method, subroutine or component where execution of the function, method, subroutine or component is limited to those users that have been granted access to the function, method, subroutine or component. Access may be granted on the basis of roles, privileges, rights, user identifiers, passwords and combinations thereof The embodiments of the invention are not limited to any particular access control mechanism. In some embodiments, role based access control is used. The access control target may be used to limit access to functionality that is part of the software application, or it may be used to provide access to services. Examples of such services include web servers 222, J2EE services 224 and database services 226.

Access to the services may be directly through the access control target, or through an intermediate interface. Examples of such intermediate interfaces include web service proxy (WSProxy) interfaces 212 and JAVA database connectivity (JDBC) interfaces 216. The embodiments of the invention are not limited to particular service interfaces. 100231 Access control to the functions and services may be defined as access control policies 232, 234 and 236. In general, an access control policy defines the conditions under which an application user may be granted access to application features, functions, methods and/or data. The policy may use various attributes to define access control, including but not limited to user identifications, roles, privileges, passwords or combinations thereof In addition, the policy may define types of access that are allowed, such as read-only, read/write, delete etc. Varying services may use varying types of access control mechanisms and therefore have differing ways of configuring access control policies. In some embodiments of the invention, access control may be provided and/or enforced by JAAS (JAVA Authentication and Authorization Service), XACML (eXtensible Access Control Markup Language) policy based enforcement components, container managed security mechanisms offered by standard J2EE (Java 2 Platform Enterprise Edition), and database security mechanisms such as stored procedures. Further information on XACML is available from OASIS Open, a consortium of major software vendors. Further information on JAAS and J2EE is available from Sun Microsystems, Inc.

In the example application configuration illustrated in FIG. 2, access to web services 222 is defined by XACML based policy 232, access to J2EE services 224 is defined by J2EE policies or JAAS policies 234, and access to database services 236 may be defined by database security policy 236. It should be noted that these access control mechanisms are exemplary, and that no embodiment of the invention is limited to a particular access control mechanism or combination of access control mechanisms.

FIGS. 3A, 3B and 3C are example access control policy configuration excerpts, each of which expresses the concept that "a user having a role of 'minister' is allowed to display a draft of a bill." FIG. 3A is an excerpt of an example access control policy configuration defined conforming to XACML standards. As shown in the example configuration, a subject-match tag is used to indicate that if the attribute role contains a string that equals "minister", then the user will be permitted to execute a method named "displayDraft."

FIG. 3B is an excerpt of an example access control policy configuration defined that conforms to J2EE standards. As shown in the example configuration, a user with a role name of "minister" is permitted to execute a displayDraft method or a reviewDraft method.

FIG. 3C is an excerpt of an example access control policy configuration defined that conforms to JAAS standards. As shown in the example configuration, a user with a role principal (i.e. identification) or "minister" is granted permission to execute exit, displayDraft, reviewDraft, startDraft and displayReview methods.

Figure 4:
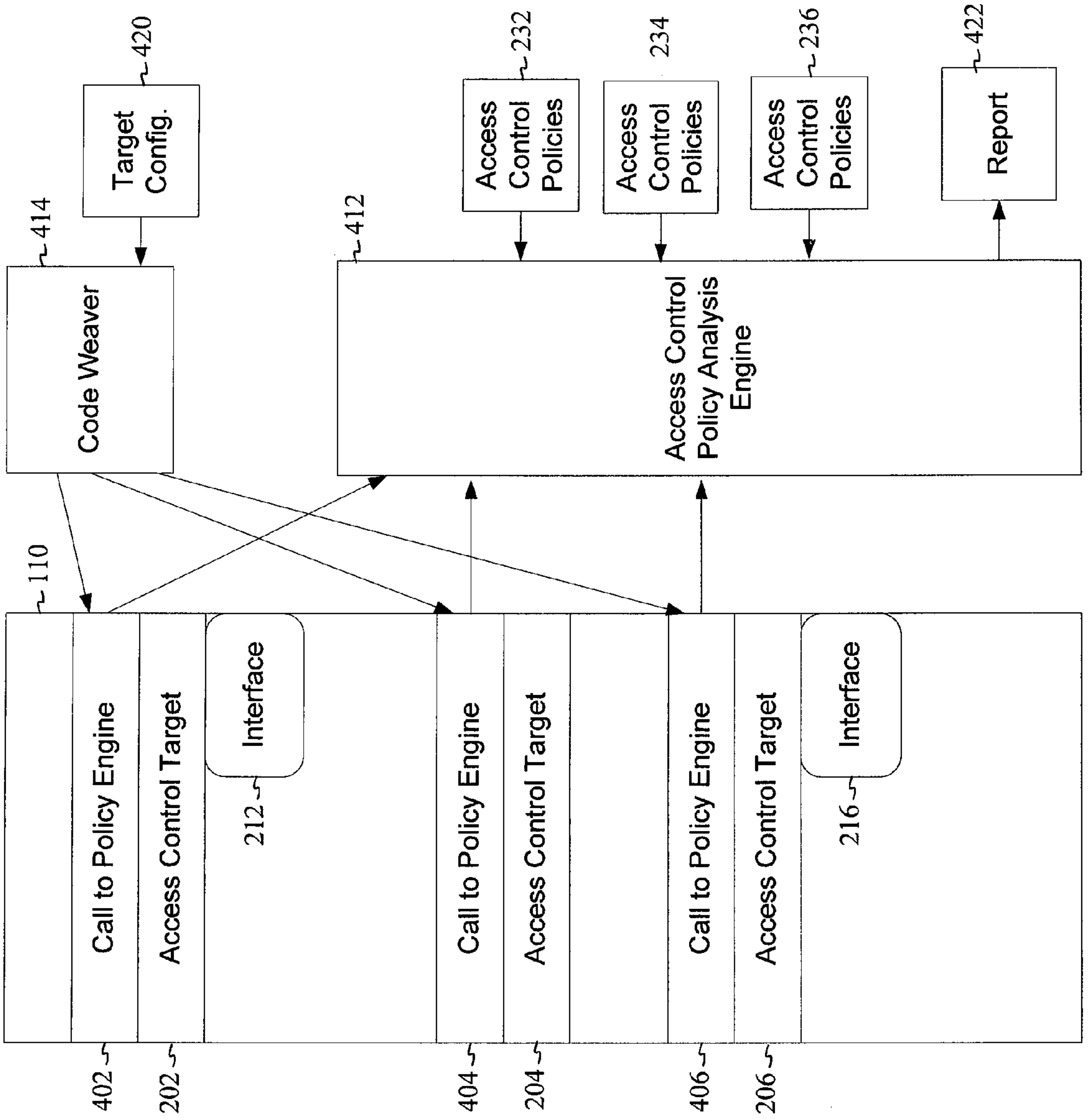
FIG. 4 provides further details for a software application environments in which embodiments of the invention may be practiced.

FIG. 4 is a diagram providing further details of a software application incorporating embodiments of the invention. In order to avoid obscuring the invention, the services components 222-226, while they may be present in varying embodiments, are not illustrated in FIG. 4. In some embodiments of the invention, a call to an access control policy analysis engine 412 is inserted (represented as calls 402, 404 and 406 in the example configuration) at points where an access control target is invoked through a call or other method of invocation, by a code weaving component 414.

Code weaving component 414 may be any type of code weaving software (also referred to as aspect weaving). In some embodiments, code weaving component 414 is the AspectJ code weaver. The AspectJ code weaver is available from the Eclipse Foundation at the URL "www.eclipse.org." In some embodiments, code weaving component 414 reads a target configuration file 420 to determine which functions, methods or components are access control functions, subroutines, methods or components of interest. An example target configuration file is shown in FIG. 6. In varying embodiments, code weaving component 414 may operate on source code or object code. In particular embodiments, code weaving component 414 operates on JAVA byte code for a JAVA virtual machine.

The inserted calls cause an access control policy analysis engine 412 to be invoked. Access control policy analysis engine 412 is a software component that includes software that reads and interprets various type of access control policies. For example, access control policy engine 412 may include software that is able to read and interpret access control policies defined using JAAS, XACML, J2EE, or database configuration files. Upon startup, or in some embodiments upon invocation, access control policy analysis engine 412 reads and interprets the various access control policy configuration files 232, 234 and 236 for various supported access control policy mechanisms. When invoked, the access control policy analysis engine 412 interprets the appropriate access control policy based on the type of access control mechanism in use by the current access control target and determines the current access control parameters (roles, privileges, rights, user IDs etc.) needed to successfully execute the access control target. These parameters may then be reported on report 422. Report 422 may be a printable report, or report 422 may be a set of data in a database or file. An example report 422 is provided in FIG. 7. Further details on the operation of the above described system are provided below with reference to the flow chart illustrated in FIG. 5.

Figure 5:
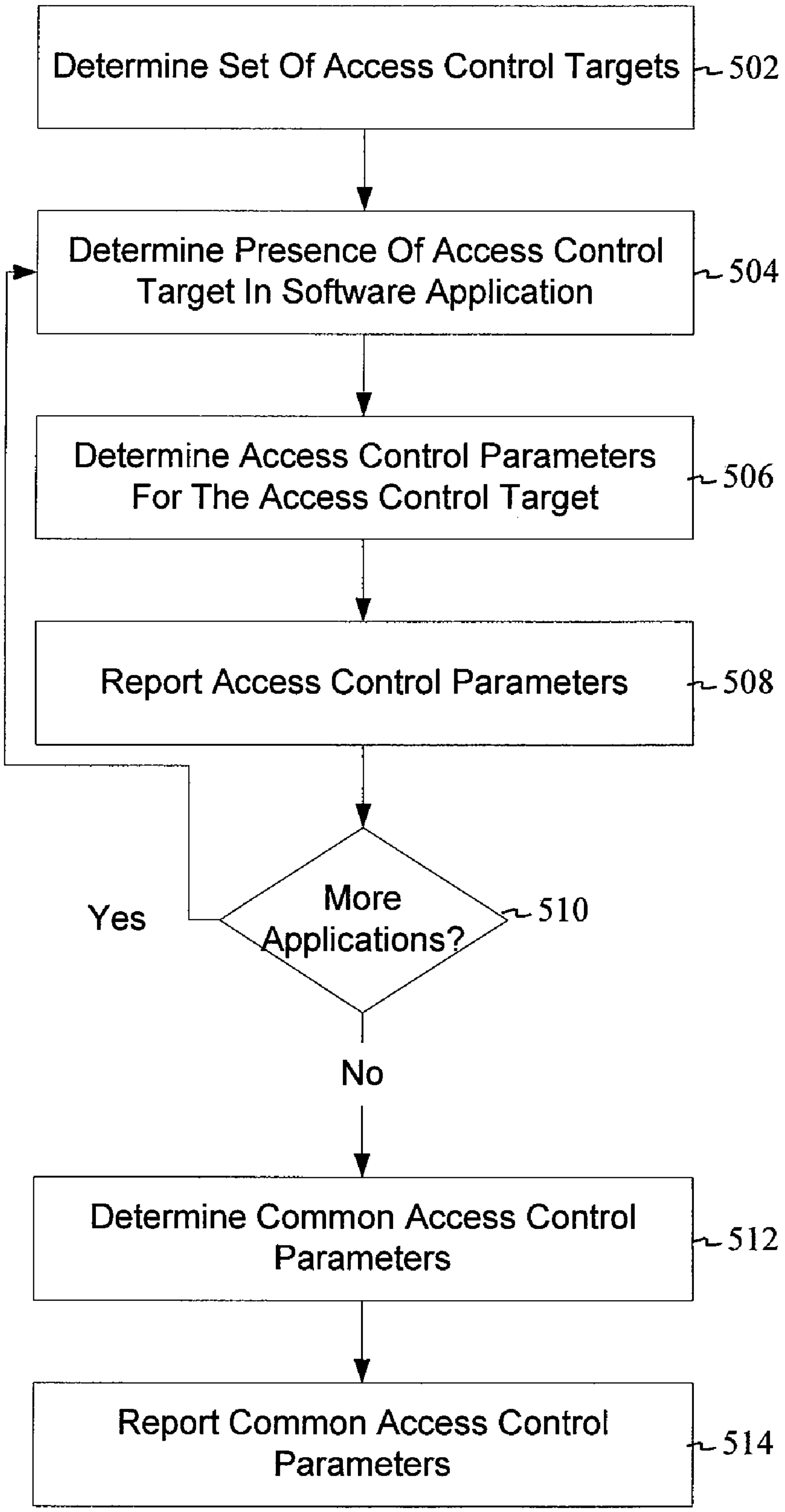
FIG. 5 is a flowchart illustrating methods for reverse engineering access control according to embodiments of the invention.

FIG. 5 is a flowchart illustrating methods for reverse engineering access control according to various embodiments of the invention. The methods may be performed within an operating environment such as that described above with reference to FIG. 4 or within alternative environments. The methods to be performed by the operating environment constitute computer programs made up of computer-executable instructions. Describing the methods by reference to a flowchart enables one skilled in the art to develop such programs including such instructions to carry out the methods on suitable computers (the processor of the computer executing the instructions from machine-readable media such as RAM, ROM, CD-ROM, DVD-ROM, flash memory etc.). The methods illustrated in FIG. 5 are inclusive of the acts performed by an operating environment executing an example embodiment of the invention.

The method begins by determining a set of access control targets for an application or set of applications in a workflow (block 502). In some embodiments of the invention, the set of access control targets is determined by reading a configuration file such as that illustrated in FIG. 6. The configuration file may include the names, classes and access control types for various access control functions, methods, subroutines or components.

Next, a system executing the method determines whether any of the access control targets are present in a software application (block 504). In some embodiments, this determination may be made by scanning the source code for the access control targets. In alternative embodiments, this determination may be made by interpreting and scanning object code to determine if the access control targets are present. In some embodiments, calls to invoke an access control policy analysis engine 412 are inserted in the source code or object code wherever an access control target is present. In particular embodiments, this insertion is accomplished using the AspectJ code weaver.

Next, a system executing the method determines access control parameters for the access control target (block 506). In those embodiments where calls to an access control policy analysis engine 412 have been inserted, this determination is made by running the subject software application. During the course of the execution of the software application, the calls to the access control policy analysis engine 412 will be invoked. The access control policy analysis engine 412 will then determine what access control parameters may be used to allow execution of the access control target. It should be noted that during this run of the software application, the user running the application does not necessarily need the required role, privilege or other rights necessary to execute the target. This is because the access control policy analysis engine 412 may be used to interpret the access control policy independently of whether or not the user has the requisite role, privilege or right.

Next, a system executing the method reports on the roles, rights, or privileges that may be used to successfully execute the access control target. As noted above, this report may be a printable report. In alternative embodiments, the reporting step may comprise storing data in a database or other persistent storage.

Next, in some embodiments, the system executing the method determines if other applications are left to be analyzed (block 510). If so, the system returns to block 504 to analyze the next application. Otherwise, the system proceeds to block 512 to determine the set of access control parameters that are common across each of the access control targets. In other words, the system determines a least common denominator for roles, privileges, rights, or other access control parameters. The set of common access control parameters may then be reported (block 514). As noted above, the report may be a printable report, or the report may comprise data store in a database, text file, or other persistent storage.

FIG. 6 illustrates an excerpt of an example configuration file according to an embodiment of the invention. The example configuration illustrated in FIG. 6 comprises a listing of access control targets that may potentially exist in software applications that are processed by the system and method embodiments. The example configuration has three sections, one for each access control type, J2EE, XACML and JAAS. Each section lists the access control targets applicable for the access control type. In the example configuration, a class name and a method name for provided for each access control target. It should be noted that the configuration file illustrated in FIG. 6 is but one example of a configuration file format. Those of skill in the art will appreciate that a configuration file may have a variety of alternative formats to that illustrated in FIG. 6 and that such alternative formats are within the scope of the present invention.

FIG. 7 illustrates an excerpt of an example report according to an embodiment of the invention. The example report includes information produced by particular embodiments of the invention after analyzing the access control policies utilized by a single application. The example report includes information about the access control target that was executed. In some embodiments, this information includes the method name of the access control target, a stack trace indicating where in the application the access control target was called, and a list of roles allowed to execute the method according to the access control policy in force for the application. In the example provided in FIG. 7, the access control policy in effect when the application was analyzed indicates that for the method entitled "doAction" in the "reac.j2ee.beans.business.Business" class, a user with a role of "judicial authority", "minister", "president", and "admin" may execute the method. In a subsequent access control target method call, a user with a role of "president" and "admin" may execute the method. Thus the two common roles that may execute both methods are "president" and "admin." Those of skill in the art will appreciate that other report formats are possible and within the scope of the present invention.

In the foregoing detailed description of embodiments of the invention, various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus the following claims are hereby incorporated into the detailed description of embodiments of the invention, with each claim standing on its own as a separate embodiment. It is understood that the above description is intended to be illustrative, and not restrictive. It is intended to cover all alternatives, modifications and equivalents as may be included within the scope of the present invention as defined in the appended claims. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," "second," and "third," etc., are used merely as labels, and are not intended to impose numerical requirements or orders on their objects unless such requirements or orders are clear from the context of their use.

What is claimed is:

1. A computer-implemented method comprising:
determining a set of access control targets, each of the access control targets being a call to a function, method, subroutine, or component to which access is limited to particular users of at least one software application;
analyzing the at least one software application to determine a presence of at least one access control target in the set of access control targets in the at least one software application;
reading an access control policy for the at least one of the set of access control targets present in the software application;
analyzing the access control policy for the at least one access control target present in the software application to determine a set of access control parameters to allow an execution of the access control target; and
reporting the access control parameters.

2. The computer-implemented method of claim 1, wherein analyzing the access control policy for the at least one access control target comprises inserting a call to an access control policy analysis component in the at least one software application.

3. The computer-implemented method of claim 2, wherein the at least one software application comprises byte code for a JAVA virtual machine.

4. The computer-implemented method of claim 2, wherein inserting the call to the access control analysis component includes utilizing a code weaving process.

5. The computer-implemented method of claim 4, wherein the code weaving process comprises the AspectJ code weaving process.

6. The computer-implemented method of claim 1, further comprising analyzing the report to determine a set of access control privileges common to ones of the set of access control targets present in the at least one software application.

7. The computer-implemented method of claim 6, wherein the at least one software application comprises at least two software applications in a workflow.

8. The computer-implemented method of claim 7, further comprising determining a set of access control privileges common across all access control targets of the set of access control targets in the workflow.

9. The computer-implemented method of claim 1, wherein the set of access control targets include an access control target selected from the group consisting of XACML, JAAS, J2EE and database roles.

10. The computer-implemented method of claim 1, further comprising:
reading an access control policy definition; and
wherein analyzing the access control policy comprises interpreting the access control policy definition.

11. A non-transitory computer-readable medium having computer executable instructions for performing a method, the method comprising:
determining a set of access control targets, each of the access control targets being a call to a function, method, subroutine, or component to which access is limited to particular users of at least one software application;
analyzing the at least one software application to determine a presence of at least one access control target in the set of access control targets in the at least one software application;
reading an access control policy for the at least one access control target present in the software application;
analyzing the access control policy for the at least one access control target present in the software application to determine a set of access control parameters to allow an execution of the access control target; and
reporting the access control parameters.

12. The non-transitory computer-readable medium of claim 11, wherein analyzing the access control policy for the at least one access control target comprises inserting a call to an access control policy analysis component in the at least one software application.

13. The non-transitory computer-readable medium of claim 11, wherein the at least one software application comprises byte code for a JAVA virtual machine.

14. The non-transitory computer-readable medium of claim 12, wherein inserting the call to the access control analysis component includes utilizing a code weaving process.

15. The non-transitory computer-readable medium of claim 14, wherein the code weaving process comprises an AspectJ code weaving process.

16. The non-transitory computer-readable medium of claim 11, wherein the method further comprises analyzing the report to determine a set of access control privileges common to ones of the set of access control targets present in the at least one software application.

17. The non-transitory computer-readable medium of claim 16, wherein the at least one software application comprises at least two software applications in a workflow.

18. The non-transitory computer-readable medium of claim 17, wherein the method further comprises determining a set of access control privileges common across all of the set of access control targets in the workflow.

19. The non-transitory computer-readable medium of claim 11, wherein the set of access control targets include an access control target selected from the group consisting of XACML, JAAS, J2EE and database roles.

20. The non-transitory computer-readable medium of claim 11, wherein the method further comprises:
reading an access control policy definition; and
wherein analyzing the access control policy comprises interpreting the access control policy definition.

21. A computerized system comprising:
an access control policy analysis engine; and
a code weaving component to:
read a set of access control targets, each of the access control targets being a call to a function, method, subroutine, or component to which access is limited to particular users of at least one software application,
analyze the at least one software application to determine a presence of at least one of the set of access control targets in the at least one software application, and
insert a call to the access control policy engine into the at least one software application;
wherein the access control policy analysis engine is further operable to:
read at least one access control policy, the access control policy having an access control policy type,
analyze the access control policy to determine one or more access control parameters to allow an execution of the at least one the access control targets in the at least one software application; and
report the one or more access control parameters.

22. The computerized system of claim 21, wherein the at least one software application comprises byte code for a JAVA virtual machine.

23. The computerized system of claim 21, wherein the code weaving component comprises an AspectJ code weaver.

24. The computerized system of claim 21, wherein the access control policy analysis engine is further operable to analyze the report to determine a set of access control parameters common to the set of access control targets present in the at least one software application.

25. The computerized system of claim 24, further comprising a workflow and wherein the at least one software application comprises at least two software applications in the workflow.

26. The computerized system of claim 25, wherein the access control policy analysis engine is further operable to determine a set of access control privileges common across all of the set of access control targets in the workflow.

27. The computerized system of claim 21, wherein the set of access control target types include an access control target type selected from the group consisting of XACML, JAAS, J2EE and database roles.

* * * * *